United States Patent [19]
Kimura et al.

[11] Patent Number: 5,531,572
[45] Date of Patent: Jul. 2, 1996

[54] CAPACITY CONTROL VALVE FOR A VARIABLE CAPACITY REFRIGERANT COMPRESSOR

[75] Inventors: Kazuya Kimura; Kenji Takenaka, both of Kariya; Takahiro Maeda, Minato-ku, all of Japan

[73] Assignee: Kabushiki Kaisha Toyoda Jidoshokki Seisakushi, Aichi, Japan

[21] Appl. No.: 321,752

[22] Filed: Oct. 12, 1994

[30] Foreign Application Priority Data

Oct. 15, 1993 [JP] Japan .................... 5-258741

[51] Int. Cl.⁶ .................................. F04B 1/26
[52] U.S. Cl. .................................. 417/222.2
[58] Field of Search .......................... 417/222.2

[56] References Cited

U.S. PATENT DOCUMENTS

| | | |
|---|---|---|
| 4,428,718 | 11/1984 | Skinner . |
| 4,723,891 | 2/1988 | Takenaka et al. ............ 417/222.2 |
| 5,205,718 | 4/1993 | Fujisawa et al. ............ 417/222.2 |
| 5,318,410 | 6/1994 | Kawamura et al. ............ 417/222.2 |

FOREIGN PATENT DOCUMENTS

| | | |
|---|---|---|
| 62-31782 | 2/1987 | Japan . |
| 49976 | 2/1990 | Japan .................... 417/222.2 |

*Primary Examiner*—Charles Freay
*Attorney, Agent, or Firm*—Burgess, Ryan and Wayne

[57] ABSTRACT

A capacity control valve for a variable capacity refrigerant compressor for controlling the compressor capacity by adjustably changing a pressure level prevailing in a crank chamber of the compressor, the capacity control valve having a valve mechanism opening and closing a portion of a gas-supply passageway extending between a discharge chamber and the crank chamber of the compressor, and a discharge pressure responsive unit controlling a movement of the valve mechanism in such a manner that only when the discharge pressure of the refrigerant gas is below a predetermined pressure level, does the valve mechanism reduce the opening area of the portion of the gas-supply passageway due to a force provided by the discharge pressure responsive unit in addition to a different force produced by the discharge pressure of the refrigerant gas. The capacity control valve enables the compressor to produce a satisfactory refrigerating performance irrespective of the environmental temperature.

6 Claims, 9 Drawing Sheets

CAPACITY CONTROL VALVE FOR A VARIABLE CAPACITY REFRIGERANT COMPRESSOR

BACKGROUND OF THE INVENTION

1. Field of the Invention

The present invention relates generally to a variable capacity type refrigerant compressor suitable for being incorporated in a refrigerating circuit of an automobile climate control system, and provided with a capacity control valve for adjustably changing the compressor capacity as required. More particularly, the present invention relates to a capacity control valve for controlling the discharge capacity of a variable capacity refrigerant compressor by controlling the pressure prevailing in a compressor crank chamber in which a pressure responsive piston-reciprocating-mechanism is incorporated.

2. Description of the Related Art

An example of a conventional variable capacity refrigerant compressor suitable for being incorporated in a refrigerating circuit of a climate control system of automobiles is disclosed in U.S. Pat. No. 4,428,718 to Skinner. This variable capacity compressor is provided with a cylinder block in which a plurality of cylinder bores for receiving reciprocating pistons are arranged parallel to a central axis of the cylinder block. The axial ends, i.e., front and rear ends of the cylinder block are air-tightly closed by front and rear housings, respectively, and therefore, a crank chamber is arranged between the front housing and the front end of the cylinder block so as to receive therein a piston-reciprocating-mechanism including a drive shaft rotatably supported by the front housing and the cylinder block. The piston-reciprocating-mechanism further includes a drive plate member mounted around the drive shaft in such a manner that it is able to rotate together with the drive shaft and to change the inclination angle thereof from a plane perpendicular to the axis of rotation of the drive shaft. The drive shaft supports thereon, via a thrust bearing, a non-rotatable wobble plate to which a plurality of reciprocating pistons slidable in the respective cylinder bores are operatively connected by respective connecting rods.

The rear housing is provided with a suction chamber and a discharge chamber formed therein which are communicated with the cylinder bores via suction ports and discharge ports formed in a valve plate arranged between the rear end of the cylinder block and the rear housing. The rear housing receives therein a capacity control valve for adjustably changing the compressor capacity, which corresponds to a typical conventional control valve as shown in FIG. 9.

The capacity control valve of FIG. 9 is provided with a suction pressure detecting means formed by bellows 91 responsive to a change in the gas pressure Ps of a refrigerant gas entering the compressor, a gas-supply passageway 92 arranged between the discharge and crank chambers of the compressor, a gas-extraction passageway 93 arranged between the crank and suction chambers of the compressor, and a valve mechanism 94 provided for controlling the closing and opening of both passageways 92 and 93, in response to a movement of the bellows 91.

The capacity control valve of FIG. 9 is also usable as a capacity control valve incorporated in a variable capacity refrigerant compressor disclosed in Japanese Unexamined utility Model Publication (Kokai) No. 62-31782 (i.e., JU-A-'782). The capacity control valve of the compressor of JU-A-'782 is substantially the sac as the control valve of FIG. 9 except that it is provided with a pressure detecting mechanism arranged so as to detect the gas pressure of the refrigerant gas at the gas outlet of an evaporator of an automobile climate control system. Therefore, a further description of the prior art control valve for a variable capacity refrigerant compressor will be given below with reference to FIG. 9.

In the above-mentioned variable capacity refrigerant compressors, when the environmental temperature is increased, and when the pressure Ps of the refrigerant gas detected at either the refrigerant gas inlet of the compressor or the gas outlet of the evaporator is higher than a predetermined pressure level, the bellows 91 of the control valve of FIG. 9 is compressed so as to move the valve mechanism 94 to open the gas-extraction passageway 93 and to close the gas-supply passageway 92. Thus, the refrigerant gas at a rather high pressure moves from the crank chamber toward the suction chamber to thereby reduce the pressure level prevailing in the crank chamber. As a result, when the pressure on the backs of the respective reciprocating pistons is reduced, the reciprocating strokes of the respective pistons are increased by increasing the inclination angle of the non-rotatable wobble plate supported on the drive plate member. Thus, the compressor capacity is increased.

On the other hand, when the pressure Ps of the refrigerant gas detected at either the refrigerant gas inlet of the compressor or the gas outlet of an evaporator of the refrigerating circuit is reduced to a predetermined pressure level due to reduction in the environmental temperature, the bellows 91 (the suction pressure responsive element) of capacity control valve expands to move the valve mechanism 94 to a position where the gas-extraction passageway 93 is closed, and the gas-supply passageway 92 is opened. Thus, the compressed gas having a discharge pressure Pd in the discharge chamber of the compressor is introduced into the crank chamber of the compressor so as to increase a gas pressure Pc prevailing in the crank chamber, and accordingly, the backs of respective pistons are subjected to a higher gas pressure Pc. Thus, the reduced piston strokes of respective pistons combines to reduce the inclination angle of the non-rotatable wobble plate. Therefore, the compressor capacity is reduced.

Therefore, in the variable capacity type refrigerant compressor provided with the above-mentioned conventional capacity control valve as shown in FIG. 9, the relationship between the environmental temperature and the suction pressure Ps of the refrigerant gas, detected at either the gus inlet of the compressor or at the gas outlet of the evaporator, is established as shown in a graph of FIG. 11. In FIG. 11, Psc indicates the suction pressure of the refrigerant gas detected at the inlet of the compressor, and Pse indicates the pressure of the refrigerant gas detected at the outlet of the evaporator.

At this stage, with the control valve for a variable capacity refrigerant compressor as shown in FIG. 9, when the effective pressure receiving area of the bellows 91 is S1, a spring force set within the bellows 91 is F1, the cross-sectional area of the gas-extraction passageway 93 of the valve mechanism is S2, the cross-sectional area of the gas-supply passageway 92 of the valve mechanism 94 is S3, a spring force applied to the lower end of the valve mechanism 94 is F2, the suction pressure of the refrigerant gas is Ps, the pressure of the refrigerant gas in the crank chamber is Pc, and the discharge pressure of the refrigerant gas is Pd, the equation (1) can be defined as set forth below.

$$F1 = S1Ps + S2(Pc-Ps) + S3(Pd-Pc) + F2 \tag{1}$$

Therefore, the following equation (2) can be derived from the above equation (1).

$$F1=(S1-S3)Ps+S3Pd+(S2-S3)(Pc-Ps)+F2 \quad (2)$$

Thus, from the equation (2), it is understood that the spring force F1 varies with a change in the discharge pressure Pd. Further, it is understood from the construction of the control valve of FIG. 9 that the opening area Of the gas supply passageway 92 is determined depending on a force defined as S3 Pd and acting so as to close the gas-supply passageway 92.

Therefore, when the environmental temperature is relatively high, i.e., the environmental temperature is in the region A shown in FIG. 11, the discharge pressure Pd is accordingly increased, and the opening area of the gas-supply passageway 92 is determined by the increased discharge pressure Pd of the refrigerant gas. Accordingly, a large pressure drop ΔP appears so as to maintain the pressure Psc at the inlet of the compressor lower than the pressure Pse at the gas-outlet of the evaporator, and the pressure Pse at the gas-outlet of the evaporator can be low and substantially constant. Therefore, the evaporator can exhibit a sufficient cooling function.

On the other hand, when the environmental temperature is low, i.e., the environmental temperature is in the region B of FIG. 11, the discharge pressure Pd is greatly decreased so as to sufficiently open the gas-supply passageway 92, and therefore, the compressor capacity is excessively reduced. Thus, the pressure Psc at the suction inlet of the compressor and the pressure Pse at the gas-outlet of the evaporator are increased so as to increase the surface temperature of the evaporator. Thus, the evaporator cannot exhibit sufficient cooling function It should be understood that the relationship between the pressure Ps and the environmental temperature as shown in FIG. 11 is established under a condition such that the environmental temperature means the temperature of an outer air of an automobile, and the region "F" of FIG. 11 in which frost is attached to an outer surface of the evaporator should be avoided. Thus, if an automobile with an air switching unit for changing an air-flow in an automobile from an outer air-flow to an air-recirculation and vice versa depending on traffic condition, and when the air-flow is changed to the inner air-flow, i.e., the air-recirculation, the relationship between the environmental temperature and the suction pressure must be overlapped with region "C" in FIG. 11 in which an automobile's window is fogged. Namely, when the air outside an automobile is rather low, arid the air-flow is switched to the air-recirculation, for example, when a climate control system is automatically operated during winter season, in order to rapidly heat the interior of an automobile by the air-recirculation and to simultaneously dehumidify the ale in the cabin, since the outer air temperature is in the region "B" in FIG. 11, the temperature of the outer surface of the evaporator is increased, and accordingly, the air in the automobile cannot be sufficiently cooled. Thus, the inner air cannot be appropriately dehumidified,and the automobile window is fogged.

In order to solve the above mentioned problem, it may be possible to adjustably set the absolute inclination of the curves of the relationship between the suction pressure Ps and the environmental temperature at a small value to thereby prevent an increase in the pressures Psc and Pse.

Namely, from the above-mentioned equation (1), the equation (3) as set forth below is obtained.

$$Ps=-S3\,Pd/(S1-S2)-(S2-S3)Pc/(S1-S2)+(F1-F2)/(S1-S2) \quad (3)$$

Thus, with respect to the equation (3), if the coordinate system (Pd, Ps) is taken as similar to FIG. 11, it is understood that an inclination of lines of the relationship between Pd and Ps will be determined by −S3/(S1−S2). Therefore, if the inclination of the lines should be set small, it is required that either S1 is set large or S3 is set small. Nevertheless, if S1 is set large, the size of the bellows 91 (FIG. 9) must be large making the entire size of the control valve large. Accordingly, such a problem occurs that it is very difficult to mount the control valve in the rear housing of the variable capacity refrigerant compressor. Moreover, the performance of the control valve, i.e., the pressure response of the control valve is apt to be degraded.

On the other hand, if S3 is made small, the cross-sectional area of the gas supply passageway 92 (FIG. 9) must be reduced to thereby reduce the flow amount of the compressed gas from the discharge chamber to the crank chamber of the compressor. As a result, the performance of the control valve must be degraded.

Further, if the inclination of the lines of the relationship between Pd and Ps is set small, the pressures pse and Psc are increased in the high-temperature region of the environmental air corresponding to the region A of FIG. 11. As a result, the refrigerating performance of the climate control system provided with a variable capacity type refrigerant is insufficient in the region A. It should here be understood that the relationship between the suction pressure "Ps" and the environmental temperature as shown in FIG. 11 is established such that the environmental temperature means the temperature of air outside the automobile, and that the region "F" of FIG. 11, where frost forms on the outer surface of the evaporator, should be avoided.

Thus, if an automobile is provided with an air change-over unit for changing the air-circulation in an automobile from external air-circulation to the air-recirculation and vice versa, depending on driving conditions, and when the air-circulation is changed to the air-recirculation, the relationship between the environmental temperature arid the suction pressure of the compressor becomes inferior.

SUMMARY OF THE INVENTION

An object of the present invention is therefore to provide a control valve for a variable capacity type refrigerant compressor whereby a climate control system in an automobile can exhibit a satisfactory refrigerating performance.

In accordance with the present invention, there is provided a capacity control valve for adjustably changing a compressor capacity of a variable capacity refrigerant compressor having a suction chamber for a refrigerant gas before compression, a discharge chamber for the refrigerant gas after compression, and a crank chamber capable of communicating with the suction arid discharge chambers, the capacity control valve being incorporated in the variable capacity refrigerant compressor, and including a suction pressure responsive unit arranged for exhibiting a first (forward) and a second (reverse) movement in response to a change in the suction pressure of the refrigerant gas, and a valve mechanism arranged for controlling the opening and closing of a portion of a gas-supply passageway extending between the discharge chamber and the crank chamber of the compressor, the valve mechanism reducing the opening area of the portion of the gas-supply passageway according to the first (forward) movement of the suction pressure responsive unit when the suction pressure of the refrigerant gas is beyond a predetermined pressure level, and increasing the opening area of the portion of the gas-supply passageway according to the second (reverse) movement of the suction pressure responsive unit when the suction pressure of the refrigerant gas is below the predetermined pressure level so as to control the pressure level prevailing in the crank chamber of the compressor to thereby adjustably change the compressor capacity.

The capacity control valve is characterized by comprising:

a discharge pressure responsive unit arranged for exhibiting forward and back-ward movements in response to a change in a discharge pressure of the refrigerant gas, the discharge pressure responsive unit being operatively coupled and cooperating with the valve mechanism in such a manner that the valve mechanism reduces the opening area of the portion of the gas-supply passageway according to one of the forward and backward movements of the discharge pressure responsive unit only when the discharge pressure of the refrigerant gas is below a predetermined pressure level.

Preferably, the discharge pressure responsive unit and the valve mechanism are arranged in such a manner that when the discharge pressure of the refrigerant gas is below the predetermined pressure level, the force acting on the valve mechanism due to the discharge pressure of the refrigerant gas is equal to a different force acting on the discharge pressure responsive unit due to the discharge pressure of the refrigerant gas.

In a variable capacity refrigerant compressor provided with the above-mentioned capacity control valve of the present invention, when the suction pressure of the refrigerant gas is beyond the predetermined pressure level due to an increase in the environmental temperature, the suction pressure responsive unit of the capacity control valve is moved against a predetermined force acting thereon so as to move the valve mechanism to thereby reduce the opening area of the gas-supply passageway arranged between the discharge chamber and the crank chamber of the compressor. Thus, the pressure level in the crank chamber is reduced so as to increase the compressor capacity.

When the suction pressure is reduced to the predetermined pressure level due to a reduction in the environmental temperature, the suction pressure responsive unit is reversely moved by the predetermined force acting thereon so as to move the valve mechanism to thereby increase the opening area of the gas-supply passageway arranged between the discharge chamber and the crank chamber. Thus, the pressure level in the crank chamber is increased so as to reduce the compressor capacity.

Irrespective of the environmental temperature, during the operation of the compressor, when the discharge pressure increases beyond a predetermined pressure level, the discharge pressure responsive unit of the control valve is moved against a predetermined force acting thereon so as to permit the valve mechanism to move independently. Thus, the opening area of the gas-supply passageway of the control valve is determined by a force acting so as to reduce the opening area of the gas-supply passageway and generated by the discharge pressure. Therefore, in the control valve, widen the environmental temperature is relatively high, a relationship between the suction pressure and the environmental temperature can be established, so as to have such an inclination that the compressor can exhibit a satisfactory refrigerating performance, by the operation of the valve mechanism of the control valve.

On the other hand, when the discharge pressure is reduced below the predetermined pressure level, the discharge pressure responsive unit of the control valve is reversely moved by the predetermined force acting thereon, and the valve mechanism of the control valve is moved in association with the discharge pressure responsive unit so as to close the gas-supply passageway arranged between the discharge chamber and the crank chamber of the compressor. Thus, the opening area of the gas-supply passageway is determined by a movement of the valve mechanism caused by a force generated by the discharge pressure and acting so as to reduce the opening area, and by a different movement of the valve mechanism caused by a force provided by the discharge pressure responsive unit and acting so as to reduce the opening area. Therefore, in the capacity control valve, the absolute inclination of slopes of the relationship between the environmental temperature and the suction pressure can be made small.

Thus, when the absolute inclination of slopes of the relationship between the environmental temperature and the suction pressure of the control valve is made small, even if the discharge pressure is greatly reduced in a low environmental temperature, the opening area of the gas-supply passageway of the control valve is not unnecessarily increased. Accordingly, the compressor capacity is not excessively reduced, and accordingly, an increase in the suction pressure of the refrigerant gas is suppressed so as to permit the compressor to exhibit a satisfactory refrigerating performance.

Further, in the control of the present invention, the relationship between the environmental temperature and the suction pressure in the cartesian coordinate system does not overlap with a region within the coordinate system in which an automobile's window is fogged. Therefore, even if the outer air temperature is low, a satisfactory refrigerating performance of the compressor can be maintained so as to perform an appropriate dehumidifying operation. Thus, the automobile window is not fogged.

In the control valve of the present invention, when the discharge pressure of the refrigerant gas is below the predetermined pressure level, if a force generated by the discharge pressure and acting on the valve mechanism of the control valve is set to be equal to a different force also generated by the discharge pressure and acting on the discharge pressure responsive unit, the opening area of the gas-supply passageway arranged between the discharge chamber and the crank chamber of the compressor can be determined without affected by the discharge pressure of the refrigerant gas.

BRIEF DESCRIPTION OF THE DRAWINGS

The above and other objects, features and advantages of the present invention will be made more apparent from the ensuing description of preferred embodiments thereof in conjunction with the accompanying drawings wherein.

DESCRIPTION OF PREFERRED EMBODIMENTS

Figure 1:
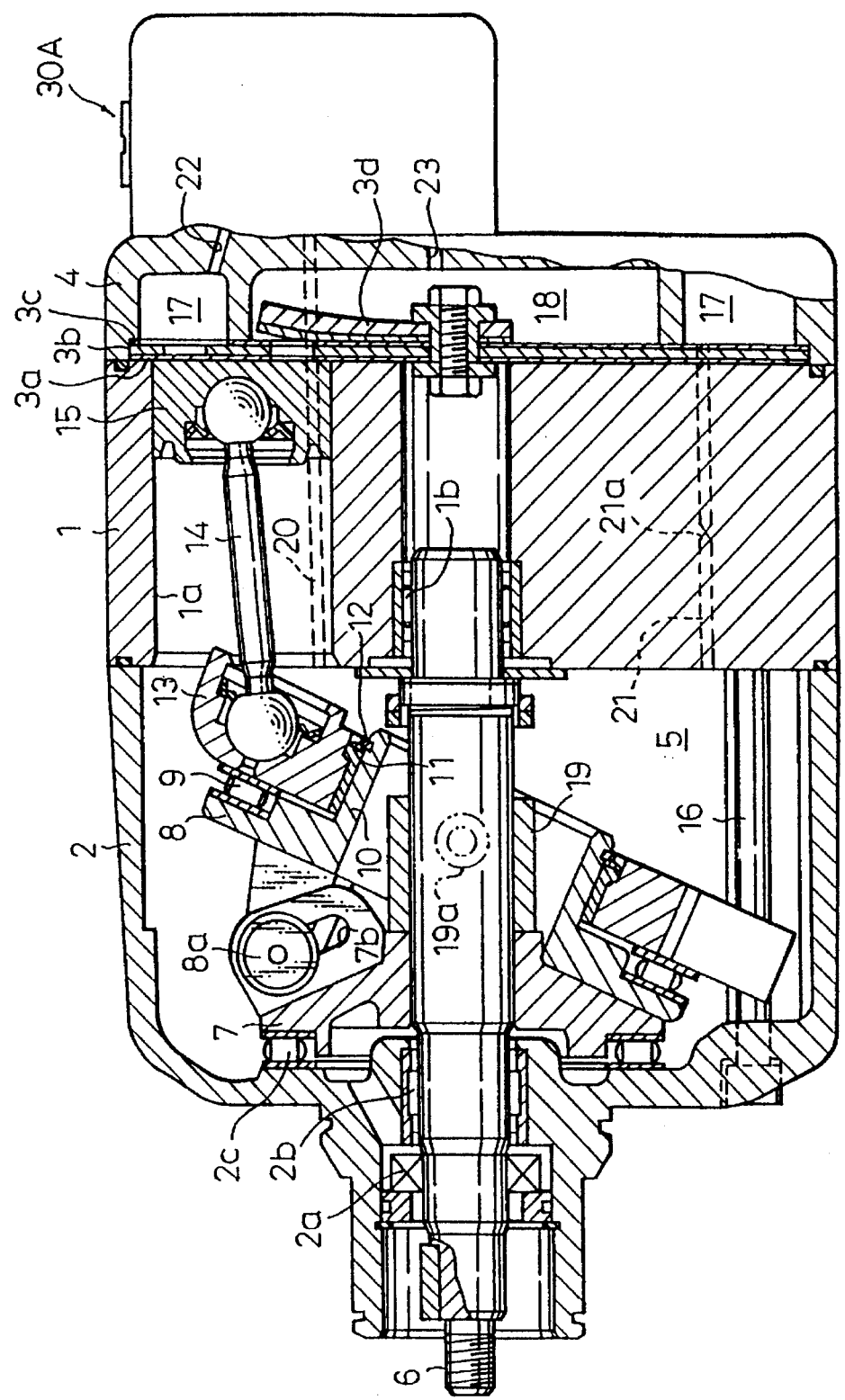
FIG. 1 is a cross-sectional view of a variable capacity refrigerant compressor in which a capacity control valve according to an embodiment of the present invention is incorporated.

Referring to FIG. 1, a variable capacity refrigerant compressor having a capacity control valve according to the present invention is provided with a cylinder block 1 provided with a plurality of cylinder bores 1a arranged around a central axis of the cylinder block 1. The opposite ends of the cylinder block 1, i.e., the front and rear ends, are sealingly closed by a front housing 2 and a rear housing 4, respectively, and a crank chamber 5 is formed in the front housing 2 so as to be arranged in front of the front end of the cylinder block 1. In the crank chamber 5, a rotatable drive shaft 6 is arranged in such a manner that a front end of the drive shaft 6 is sealed by a shaft seal element 2a and supported by a radial bearing 2b arranged in the front end portion of the front housing 2. The rear end of the drive shaft 6 is supported by a radial bearing 1b arranged in the central bore of the cylinder block 1. The drive shaft 6 supports thereon a rotor element 7 so as to be rotated together with the shaft. The rotor element 7 is axially supported by an inner wall of the front housing 2 via a thrust bearing 2c. A sleeve element 19 is supported on the drive shaft 6 and arranged adjacent to the rotor element 7.

The rotor element 7 is provided with an elongated through-hole 7b in which a pin element 8a connecting a drive plate 8 in the form of a swash plate on the rotor element 7, is inserted. The connecting pin 8a can be moved in the elongated through-hole 7b in response to a movement of the drive plate 8 for changing an angle of inclination thereof with respect to a plane perpendicular to an axis of rotation of the drive shaft 6. The drive plate 8 mounted around the drive shaft 6 is pivotally supported by the sleeve element 19 via lateral trunnion pins 19a, and is provided with a support drum on which a wobble plate 13 is mounted via a thrust bearing 9, a slide bearing 10, a race member 11, and a thrust washer 12 so that the wobble plate 13 does not rotate in the crank chamber 5. Namely, the wobble plate 8 is permitted to wobble in response to a nutating motion of the drive plate 8 about the axis of rotation of the drive shaft 6 but is prevented from being rotated by a guide rod 16 extending axially through the crank chamber 5 and engaged with a portion of the wobble plate 13.

The wobble plate 13 is engaged with a plurality of pistons 15 via respective connecting rods 14, and the respective pistons 15 are fitted in the cylinder bores 1a so as to be axially reciprocated in response to a nutating motion of the wobble plate 13.

The rear housing 4 is provided with an outer suction chamber 17, and an inner discharge chamber 18 formed therein. The suction chamber 17 communicates with the respective cylinder bores 1a via the respective suction valves 3a arranged on a front face of a valve plate 3b, and the discharge chamber 18 communicates with cylinder bores 1a via respective discharge valves 3c arranged on rear face of the valve plate 3b. The valve plate 3b and the discharge valves 3c are formed therein with suction ports in registration with respective cylinder bores 1a. The suction ports are closed and opened by the suction valves 3a, and provide a fluid communication between the suction chamber 17 and respective cylinder bores 1a during the opening of the suction ports. The suction valves 3a and the valve plate 3b are formed with discharge ports in registration with the respective cylinder bores 1a. The discharge ports are closed and opened by the respective discharge valves 3c, and provide a fluid communication between the discharge chamber 18 and the respective cylinder bores 1a during the opening of the discharge ports. A retainer element 3d arranged in the discharge chamber 18 is provided for limiting the opening movement of the discharge valves 3c.

The compressor is also provided with a capacity control valve 30A according to a first embodiment of the present invention. The capacity control valve 30A is arranged in the rear housing 4 at a position rearward from the suction and discharge chambers 17 and 18. The cylinder block 1 and the rear housing 4 of the compressor are formed therein with a gas-supply passageway 20 arranged so as to extend between the crank chamber 5 and the capacity control valve 30A, and a gas-extraction passageway 21 arranged so as to extend between the crank chamber 5 and the suction chamber 17. The gas-extraction passageway 21 is provided with an orifice 21a arranged at a suitable position in the passageway 21.

The rear housing 4 is formed with a communication passageway 22 so as to provide a fluid communication between the suction chamber 17 and the capacity control valve 30A, and with a gas-supply passageway 23 arranged so as to provide a fluid communication between the discharge chamber 18 and the capacity control valve 30A as required.

The Construction and operation of the above-mentioned capacity control valve 30A will be described hereinbelow with reference to FIGS. 2 through 4 in addition to FIG. 1.

The capacity control valve 30A is provided with an upper cylindrical housing 31, an intermediate valve body 33, and a end cap member 38 which are combined together to form an integral valve unit suitable for being incorporated in the rear housing 4 (FIG. 1) of the compressor.

Figure 3A:
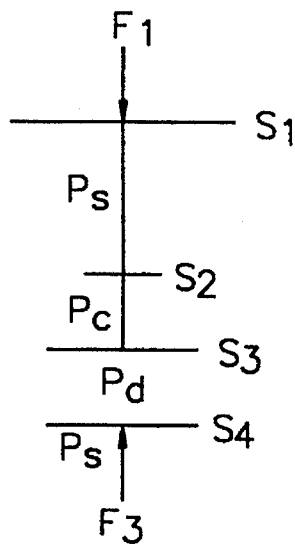
FIG. 3A is a schematic view of the control valve of FIG. 2, illustrating the state thereof in which a refrigerant discharge pressure of the compressor is increased beyond a predetermined pressure level.
Figure 3B:
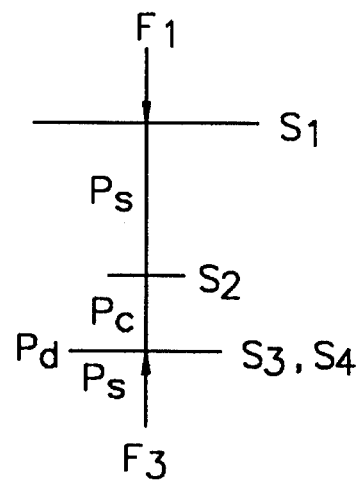
FIG. 3B is a view similar to FIG. 3A, illustrating a different state thereof in which the refrigerant discharge pressure of the compressor is redfaced below the predetermined pressure level.

An adjusting member 32 is threadedly engaged in an uppermost aperture of the upper cylindrical housing 31, and is sealed by an O-ring. The lower end of the cylindrical housing 31 is covered with a guide plate 34 so as to define a suction pressure chamber 51 within the cylindrical housing 31 between the adjusting member 32 and the guide plate 34. The cylindrical housing 31 is formed with radial passageways 51a which communicates with the suction chamber 51 and with the aforementioned communication passageway 22 of the rear housing 4. Therefore, suction pressure Ps prevails in the suction chamber 51. Within the suction chamber 51, a pressure sensitive element made of bellows 36 is received so as to form a suction pressure responsive element. The upper end of the bellows 36 is engaged with a lower protrusion of the adjusting member 32, and a lower end of the bellows 36 is engaged with a head of a rod 35A centrally arranged in the valve body 33 so as to axially extend through the valve body 33. The bellows 36 has a vacuum interior chamber in which a compression spring 36a in the form of a coil spring is received so as to provide the bellows 36 with a predetermined and preadjusted spring force. The bellows 36 has an effective cross-sectional area S1 (FIGS. 3A and 3B), and exhibits an elastic force acting in cooperation with the spring force of the compression spring 36a so as to axially extend the bellows 36. Namely, as shown in FIGS. 3A and 3B, the addition of the elastic force of the bellows 36 and the predetermined spring force of the compression spring 36a is F1 (FIGS. 3A and 3B).

The above-mentioned rod 35A slides axially in the valve body 33 in response to extension and contraction of the bellows 36 under the guidance of a guide hole formed in the guide plate 34 which is also formed with a plurality of communication holes in the peripheral portion of the guide plate 34. It should be understood that the cross-sectional area of the rod 35A is predetermined so as to be S2 (FIGS. 3A and 3B).

The valve body 33 is formed, at a middle portion thereof, with a pair of radial gas-supply passageways 20a which are communicated with the aforementioned gas-supply passageway 20 of the compressor. The valve body 33 is also formed with a pair of gas-supply passageways 23a, located below the pair of gas-supply passageways 20a, which fluidly communicate with the aforementioned gas-supply passageway 23 in the rear housing 4 of the compressor.

An insertion element 37 is axially inserted into the valve body 33 from the lower end the valve body 33 and is air-tightly sealed by an O-ring fitted in the outer circumference of the inserter element 37 which is prevented by the end cup member 38 from being withdrawn from the valve body 33.

The valve body 33 is provided with a central discharge pressure chamber 52 which communicates with the gas-supply passageways 23a and the upper end of the inserted element 37 is exposed at the lower end of the discharge pressure chamber 52. A valve seat 39 is formed in an inner wall portion of the valve body 33 and is arranged adjacent to an upper end of the discharge pressure chamber 52 axially opposite to the above-mentioned upper end. A cross-sectional area of the valve seat 39 is predetermined to be S3 (FIGS. 3A and 3B ).

The discharge pressure chamber 52 in the valve body 33 is communicated with the discharge chamber 18 (FIG. 1) of the compressor via the gas-supply passageways 23a and 23, and accordingly, the refrigerant gas, at a discharge pressure Pd, is introduced in-to the discharge pressure chamber 52 in which a ball valve 40, in the form of a ball bearing, is received and engaged with the lowermost end of the rod 35A.

The valve body 33 is further formed with axial passageways 33a extending through a peripheral portion of the valve body 33 so as not to intersect the gas-supply passageways 20a and 23a. Since upper ends of the axial passageways 33a are communicated with the suction pressure chamber 51 via through-holes in the guide plate 34, the axial passageways 33a are arranged for providing a fluid communication between the suction pressure chamber 51 of suction pressure responsive unit and a pressure chamber 53 defined in the end cup member 38 and between the lower end of the inserter member 37 and the inner end of the end cup member 38. Thus, the suction pressure Ps constantly prevails in the pressure chamber 53.

A pressure responsive rod 41 is slidably and sealingly received in the inserter member 37 so as to be moved in responsive to a change in the discharge pressure Pd. Namely, the upper portion of the pressure responsive rod 41 is sealed by an O-ring, and is exposed to the discharge pressure Pd prevailing in the discharge chamber 52. The uppermost end of the pressure responsive rod 41 is free to be disengaged and engaged with the above-mentioned ball valve 40, and the lowermost end of the pressure responsive rod 41 is supported by a compression spring 41a seated in the chamber 53 via a cup-like support washer.

A cross-sectional area of the pressure responsive rod 41 is predetermined to be S4 (FIGS. 3A and 3B), and a spring force of the compression spring 41a acting as a biasing force pushing the pressure responsive rod 41 upward is predetermined to be F3.

Figure 2:
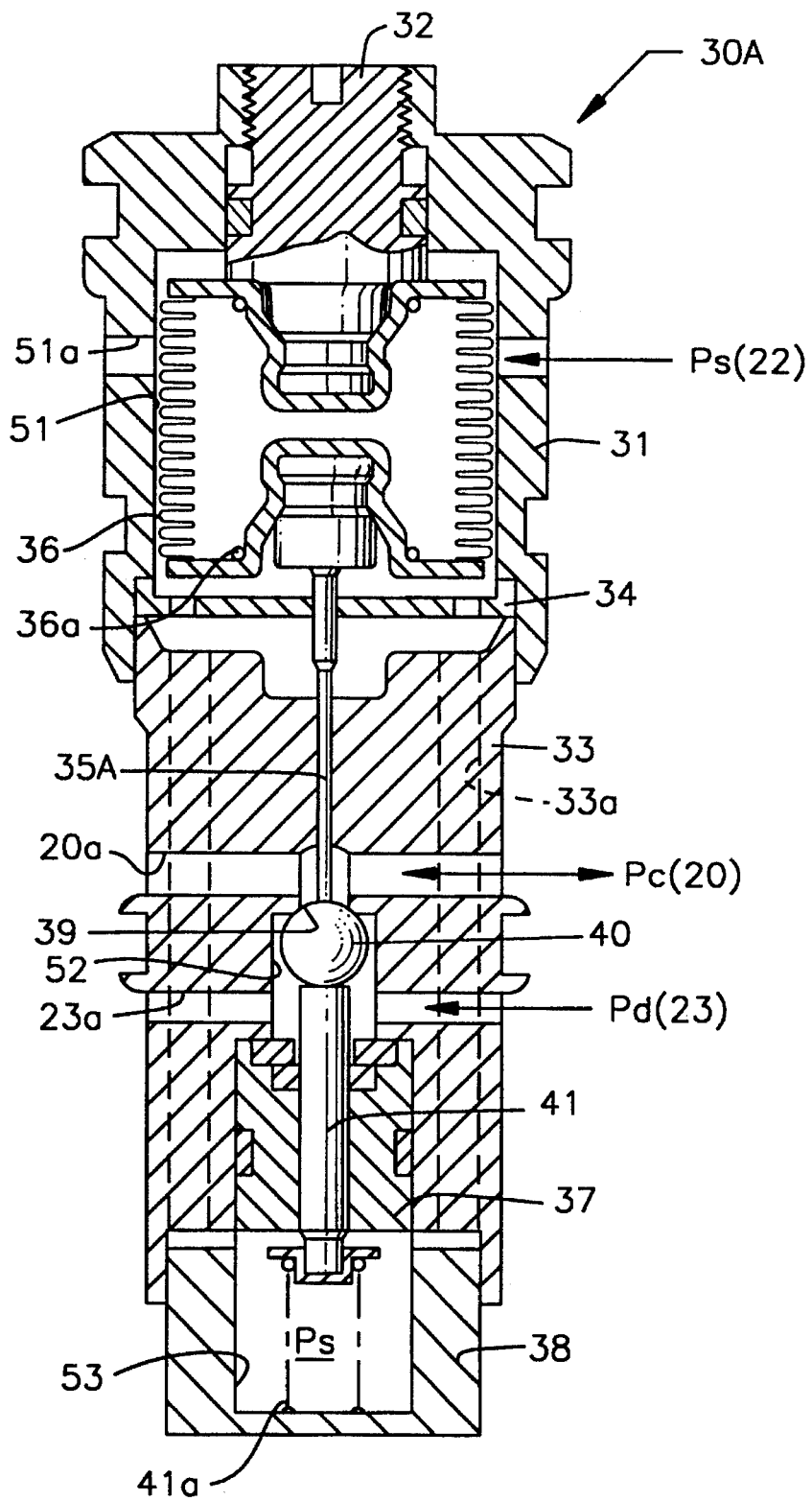
FIG. 2 is a cross-sectional view of a capacity control valve, incorporated in a variable capacity refrigerant compressor, according to a first embodiment of the present invention.

A variable capacity refrigerant compressor, which includes the above-mentioned capacity control valve 30A, is incorporated in a refrigerating circuit of an automobile climate control system in combination with a condenser, an expansion valve, and an evaporator, and is driven by an automobile engine via a suitable power transmission mechanism connected to the drive shaft 6 (FIG. 2).

When the drive shaft 6 of the compressor is rotated together with the rotor element 7, the inclined drive plate 8 carries out a nutating motion together with the non-rotatable wobble plate 13 to thereby cause reciprocation of the respective pistons 15 in respective cylinder bores 1a. Thus, a refrigerant gas is introduced into respective cylinder bores la from the suction chamber 17 which is fluidly communicated with the evaporator. Accordingly, as the pistons 15 are reciprocated, the entropy of the refrigerant gas in the respective cylinder bores la is gradually increased. Thus the refrigerant gas is eventually compressed within the respective cylinder bores la. The compressed refrigerant gas is urged by the reciprocating pistons 15 so as to be discharged from the cylinder bores 1a toward the discharge chamber 18 which is fluidly communicated with the condenser of the refrigerating circuit.

At this stage, when the discharge pressure Pd is increased beyond a predetermined pressure level Pd0, when the pressure responsive rod 41 is moved down against the biasing force of the compression spring 41a, the rod 41 comes to a position where it is disengaged from the ball valve 40.

Thus, when the environmental temperature of an automobile provided with a climate control system including a refrigerating circuit having therein a variable capacity refrigerant compressor is increased so as to increase the suction pressure Ps, i.e., the suction pressure Psc at the inlet port of the compressor to a pressure level beyond a predetermined suction pressure, the suction pressure responsive unit, i.e., the bellows 36 contracts against the spring force of the compression spring 36a and the elasticity of the bellows per se. Therefore, the rod 35A is pulled up, and the ball valve 40 is pressed against the valve seat 39 so as to close the gas-supply passageways 20a and 23a in the valve body 33. Accordingly, a fluid communication between the gas-supply passageways 20 and 23 is interrupted so that in the compressor, the crank chamber 5 is fluidly disconnected from the discharge chamber 18. Therefore, since the crank chamber 5 is communicated with the suction chamber 17 via the gas-extraction passageway 21 having therein the orifice 21a, the refrigerant gas moves from the crank chamber 5 toward the suction chamber 17. Thus, since there is no supply of a high pressure refrigerant gas from the discharge chamber 18 into the crank chamber 5, a pressure level Pc prevailing in the crank chamber 5 is reduced so as to decrease a back pressure acting on respective pistons 15. Accordingly, respective pistons 15 carry out reciprocation over a large piston stroke while the angle of inclination of the drive and wobble plates 8 and 13 increases. Therefore, a large capacity compression operation of the compressor is carried out.

While the discharge pressure Pd of the refrigerant gas is beyond the predetermined pressure Pd0, when the environmental temperature is reduced so as to reduce the suction pressure Ps to a predetermined suction pressure level, the bellows 36 is expanded downward due to the force F1 which overcomes the suction pressure PS. Thus, the ball valve 40 is pushed down by the rod 35A and is moved away from the valve seat 39. Therefore, the gas-supply passageways 23, 23a, 20a, and 20 are opened so as to establish a fluid communication between the discharge chamber 18 and the crank chamber 5 of the compressor. Therefore, a high pressure refrigerant gas is supplied from the discharge chamber 18 into the crank chamber 5 to thereby raise a pressure level Pc in the crank chamber 5. Accordingly, in response to an increase in a back pressure acting on the respective pistons 15, an angle of inclination of the drive and wobble plates 8 and 13 is reduced so as to reduce the piston stroke of the respective pistons 15. As a result, a low capacity compression operation of the compressor is carried out.

When attention is directed to the operation of the capacity control valve 30A during the above-mentioned operation of the compressor, it can be understood from FIGS. 3A and 3B that the force F1 acting on the bellows 36 of the capacity control valve 30A can be defined by the equation (4) as set forth below.

$$F1 = S1Ps + S2(Pc-Ps) + S3(Pd-Pc) \quad (4)$$

Thus, the equation (4) can be rewritten as the equation (5) as set forth below.

$$F1 = (S1-S3)Ps + S3\,Pd + (S2-S3)(Pc-Ps) \quad (5)$$

Thus, it can be seen that the equation (5) is substantially equal to the aforementioned equation (2) except that there is no force in the equation (5), which corresponds to the force F2 of the equation (2).

Thus, from the equation (5), it can be understood that the opening areas of the gas-supply passageways 23, 23a, 20a and 20, namely, the extent of fluid communication between the discharge chamber 18 and the crank chamber 5 of the compressor, are determined depending on the force of S3×Pd which acts so as to push the ball valve 40 upward to thereby reduce the extent of the above-mentioned fluid communication. This is substantially similar to the capacity control valve shown in FIG. 9.

Further, from the equation (4), the equation (6) can be defined as set forth below.

$$ps = -S3\,Pd/(S1-S2) - (S2-S3)Pc/(S1-S2) + F1/(S1-S2) \quad (6)$$

The equation (6) is substantially similar to the aforementioned equation (3) with respect to the conventional capacity control valve except that the equation (6) does not include an item of a force corresponding to the force F2 of the equation (3).

Therefore, if the equation (6) is shown in a cartesian coordinate system in which the ordinate indicates Ps and the abscissa indicates Pd, it is understood that an inclination of the line indicating the relationship between Pd and Ps can be determined by $-S3/(S1-S2)$.

Figure 4:
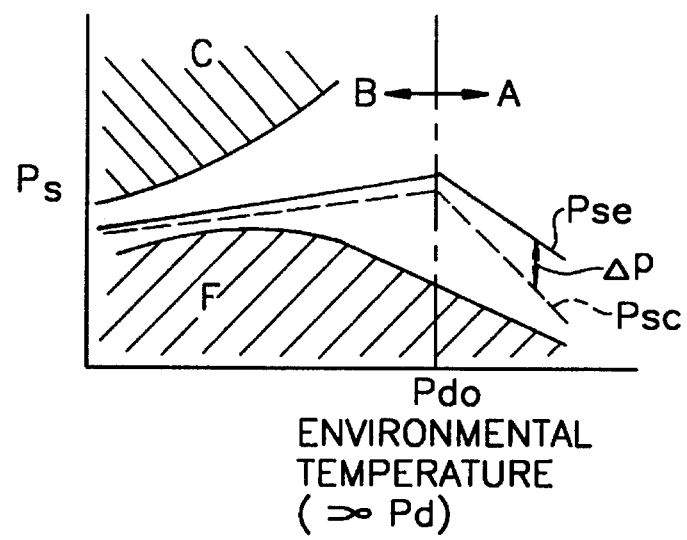
FIG. 4 is a graphical view, illustrating the relationship between the environmental temperature and a refrigerant suction pressure with respect to a variable capacity refrigerant compressor incorporating therein the capacity control valve as shown in FIGS. 2 through 3B.

Therefore, as shown in FIG. 4, when the environmental temperature is relatively high (i.e., the environmental temperature in the region "A"), the relationship between the environmental temperature and the suction pressure Ps of the compressor can be established by the operation of the valve mechanism of the capacity control valve 30A, so that a constant inclination of the line indicating the relationship between the Pd and Ps is maintained. Namely, the suction pressure Psc at the gas-outlet of the evaporator which corresponds to an addition of the suction pressure Pc at the gas-inlet of the compressor and a pressure loss ΔP is maintained at a low constant pressure level, and the compressor can exhibit a satisfactory refrigerating function.

On the other hand, when the discharge pressure Pd is below the predetermined pressure level Pd0 so that the pressure responsive rod 41 of the capacity control valve 30A is moved upward by the biasing force of the compression spring 41a, the pressure responsive rod 41 is engaged with the ball valve 40. At this stage, as shown in FIG. 3B, the force F1 acting on the bellows 36 so as to extend it can be defined as the equation (7) Shown below.

$$F1 = S1\,Ps + S2(Pc-Ps) + S3(Pd-Pc) + S4(Ps-Pd) + F3 \quad (7)$$

The equation (7) can be changed to the equation (8) as set forth below in the same manner as the equations (2) and (5).

$$F1 = (S1-S3+S4)Ps + (S3-S4)Pd + (S2-S3)(Pc-Ps) + F3 \quad (8)$$

When the equation (8) is compared with the equations (2) and (5), it can be seen that the items S4 Ps, -S4 Pd, and F3 affect the determination of the force F1. Namely, the opening areas of the gas-supply passageways 23, 23a, 20a and 20 are determined by the force S3 Pd which moves the ball valve 40 upward to thereby reduce the opening areas, and by the force {(Ps-Pd) S4+F3} acting on the ball valve 40, via the pressure responsive rod 41 so as to reduce the opening areas.

Further, the equation (9) as set forth below can be obtained from the equation (7).

$$\begin{aligned}Ps = &\ -(S3-S4)Pd/(S1-S2+S4) - \\ & (S2-S3)Pc/(S1-S2+S4) + \\ & (F1-F3)/(S1-S2+S4)\end{aligned} \quad (9)$$

When the equation (9) is compared with the equations (3) and (6), it can be seen that the item $-(S3-S4)/(S1-S2+S4)$ determines the inclination of the line of the cartesian coordinate with respect to (Pd, Ps), and that the above item—(S3–S4)/(S1–S2+S4) of the equation (9) can always be smaller than S3/(S1–S2) of the equations (3) and (6), respectively. At this stage, it should be pointed out that S1>S4>S2.

Thus, according to the capacity control valve 30A, when the cross-sectional area S4 of the pressure responsive rod 41 is appropriately determined, it is possible to obtain a certain desired condition in the relationship between the environmental temperature and the suction cheer Ps of the compressor, as shown in FIG. 4. Namely, in FIG. 4, absolute inclinations of lines indicating the relationship between the environmental temperature and the suction chamber Ps (a suction pressure Psc at the gas inlet of the compressor and a suction pressure Pse at the gas outlet of the evaporator) of the compressor can be set small by bending the lines at a boundary position of regions "A" and "B" where the discharge pressure is at Pd0. It should be understood that the value Pd0 of the discharge pressure of the refrigerant gas as shown in FIG. 4 indicates a predetermined pressure level at which the regions "A" and "B" are separated from one another while causing a change in the operation of the pressure responsive rod 41 of the capacity control valve 30A.

Thus, for example, when the environmental temperature is relatively low (the region "B" in FIG. 4), and when the discharge pressure Pd is greatly reduced, the large reduction of the discharge pressure Pd does not cause any excessive opening of the gas-supply passageways 23, 23a, 20a and 20, and therefore, an excessive reduction in the compressor capacity does not occur. Thus, an increase in the suction pressure of the refrigerant gas is prevented so that the relationship between the environmental temperature and the suction pressure Ps of the compressor as shown in FIG. 4 does not pass through a region "C" in which windows of an automobile are fogged. Thus, when the temperature of the outer air outside the automobile is low, the surface temperature of the evaporator is maintained low. Accordingly, the air entering the automobile can be sufficiently cooled and dehumidified. Therefore, such air does not cause fogging of the windows of the automobile.

Figure 9:
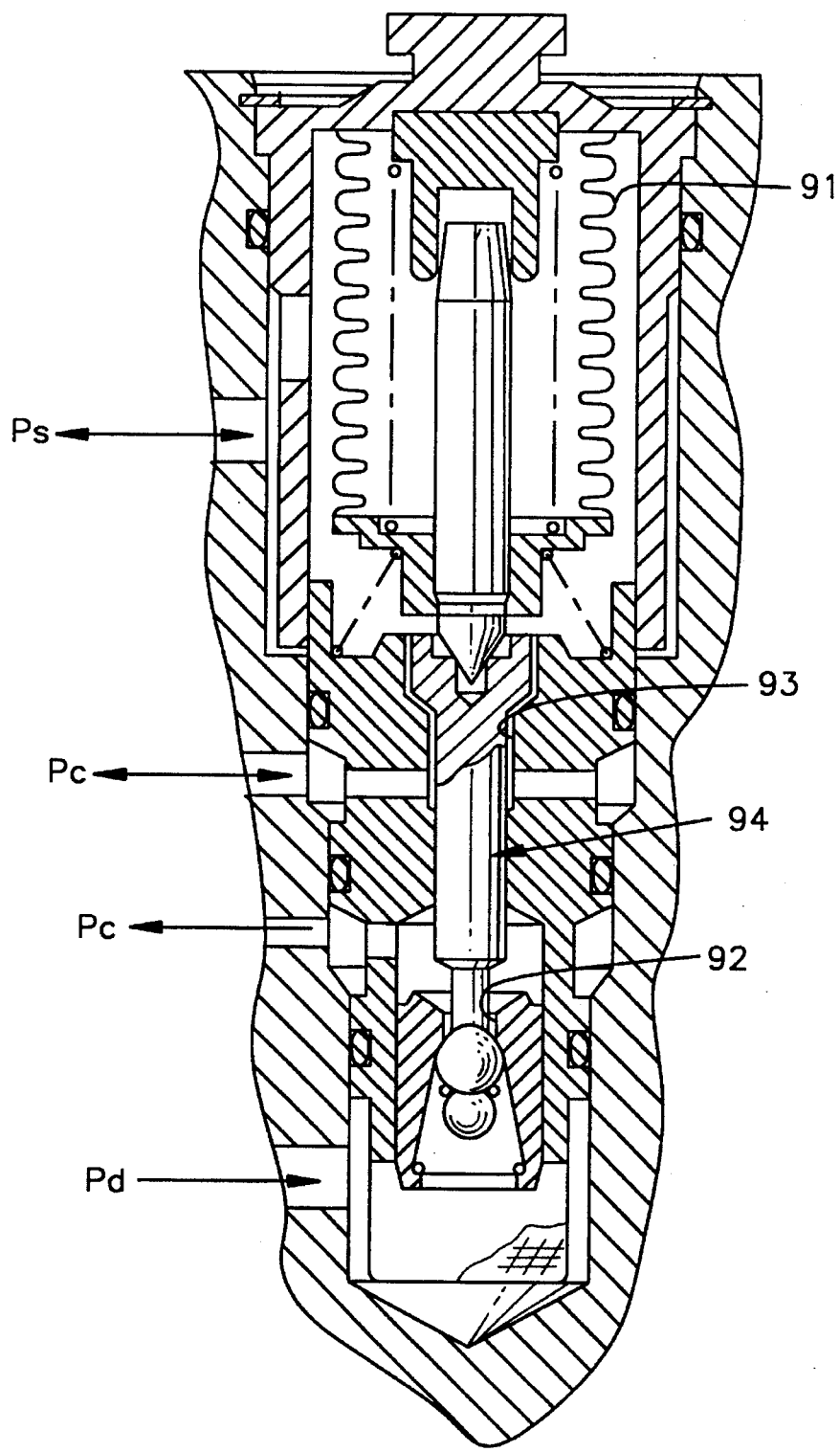
FIG. 9 is a cross-sectional view of a capacity control valve, according to a prior art, incorporated in a variable capacity refrigerant compressor.
Figure 10:
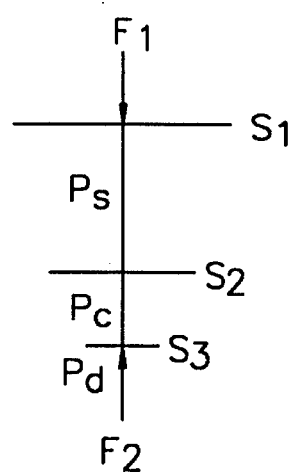
FIG. 10 is a schematic view of the capacity control valve of FIG. 9, illustrating an operating condition of a suction pressure responsive element and a valve mechanism accommodated therein; and, FIG. 11 is a graphical view illustrating a relationship between the environmental temperature and a refrigerant suction pressure with respect to a variable capacity refrigerant compressor incorporating therein the capacity control valve of FIGS. 9 and 10.
Figure 11:
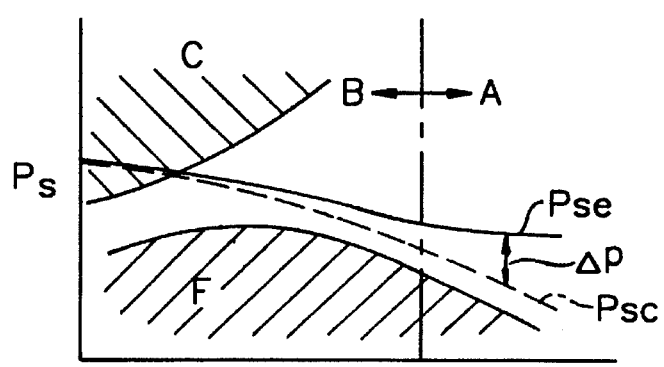

As a result, variable capacity refrigerant compressor are able to exhibit a satisfactory refrigerating function irrespective of the environmental temperature, when the capacity control valve 30A according to the first embodiment of the present invention is incorporated in the compressor. Thus, when an automobile is provided with an air-switching unit for changing the outer air system to the inner air system and vice versa, and when the automobile should be quickly heated by the automatic climate control system by using a recirculating air system, e.g., in a winter season, the air can be appropriately dehumidified before being heated and supplied into the cabin of the automobile. Thus, the automobile's windows are not fogged with respect to the compressor provided with the capacity control valve 30A of the first embodiment, when the cross-sectional area S4 of the pressure responsive rod 41 is set equal to that S3 of the valve seat 39,—(S3–S4) Pd/(S1–S2+S4) in FIG. 9 is equal to zero (=0), while the pressure responsive rod 41 is engaged with the ball valve 40. Thus, the equation (9) indicates a line parallel with the Pd axis in the cartesian coordinate system of (Pd, Ps). In this case, the pressure responsive rod 41 of the capacity control valve 30A controls the movement of the ball valve 40 so as to increase the opening areas of the gas-supply passageways 23, 23a, 20a, and 20. Thus, the opening areas of the gas-supply passageways 23, 23a, 20a, and 20 are determined depending on a balance between the force S3 Pd produced by the discharge pressure Pd and the force {(Ps–Pd) S4+F3}produced by the pressure responsive rod 41. Namely, the discharge pressure Pd varying greatly can be ignored, and the determination of the opening areas of the gas-supply passageways 23, 23a, 20a, and 20 can be determined only by the suction pressure Ps.

When the cross-sectional area S4 of the pressure responsive rod 41 is set larger than that S3 of the valve seat 39 (S4>S3), the item—(S3–S4) Pd/(S1–S2+S4) in FIG. 9 is larger than zero and positive, while the pressure responsive rod 41 is engaged with the ball valve 40 in the region "B". Thus, the equation (9) indicates a line having a positive inclination in the cartesian coordinates of (Pd, Ps). Thus, the movement of the ball valve 40 of the capacity control valve 30A is controlled so that the opening areas of the gas-supply passageways 23, 23a, 20a and 20 are reduced, and determined by the force {(Ps–Pd) S4+F3}rather than the force S3 Pd.

A second embodiment of the present invention will be described hereinbelow with reference to FIGS. 5, 6A, and 6B.

Figure 5:
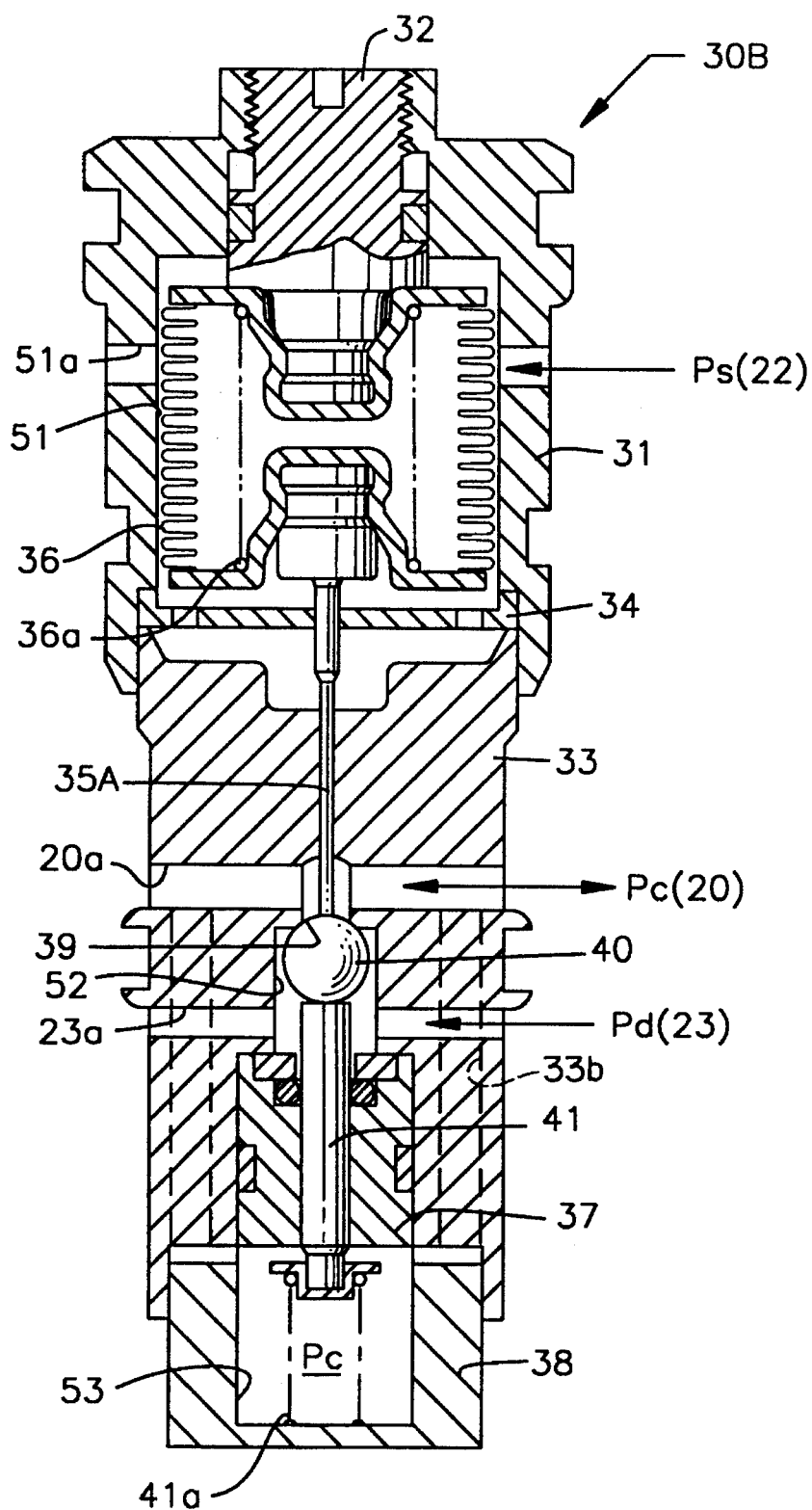
FIG. 5 is a cross-sectional view of a capacity control valve, incorporated in a variable capacity refrigerant compressor, according to a second embodiment of the present invention.
Figure 6A:
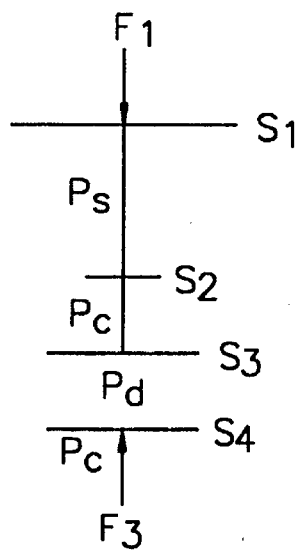
FIG. 6A is a schematic view of the control valve of FIG. 5, illustrating a state thereof in which a refrigerant discharge pressure of the compressor is increased beyond a predetermined pressure level.
Figure 6B:
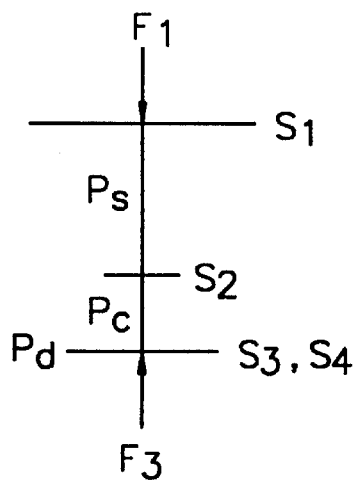
FIG. 6B is a view similar to FIG. 6A, illustrating a different state in which the refrigerant discharge pressure of the compressor is reduced below the predetermined pressure level.

A capacity control valve 30B as shown in FIG. 5 is different from the valve 30A of the first embodiment in that the interior of the pressure cheer 53 of the valve 30B is communicated with the gas-supply passageways 20a which are in turn communicated with the crank chamber 5 of the compressor. Namely, a pair of communication passageways 33b are arranged in the periphery of the valve body 33 between the above-mentioned passageways 20a and the pressure chamber 53. Thus, a pressure Pc of the crank chamber 5 prevails in the interior of the pressure chamber 53 as best shown in FIG. 5. The remaining construction of the control valve 30B is the same as that of the valve 30A, and the same parts are designated by the same reference numerals.

With the capacity control valve 30B of the second embodiment, a force F1 moving the bellows 36 can be derived from the aforementioned equation (7) of the first embodiment by referring to FIG. 6B, and defined as the equation (10) as set forth below.

$$F1 = S1\ Ps + S2\ (Pc-Ps) + S3\ (Pd-Pc) + S4\ (Pc-Pd) + F3 \ . \quad (10)$$

Thus, the above equation (10) can be rewritten as the equation (11) as set forth below.

$$F1 = (S1-S3)\ Ps + (S3-S4)Pd + (S2-S3)\ (Pc-Ps) + S4\ Pc + F3 \quad (11)$$

When the equation (11) is compared with the aforementioned equations (2) and (5) of the first embodiment, it can be seen that the items—S4 Pd, S4 Pc, and F3 have a great influence on the force F1. Namely, the opening areas of the gas-supply passageways 23, 23a, 20a, and 20 are determined by a force S3 Pd acting as a force urging the ball valve 40 upward under the discharge pressure Pd to thereby reduce the opening areas, and by an additional force {S4 (Pc–Pd)+ F3}, i.e., a force further urging the ball valve 40 upward by the movement of the pressure responsive rod 41 to thereby reduce the opening areas.

Further, from the above equation (10), the equation (12) as set forth below can be obtained.

$$\begin{aligned} Ps\ =\ &-(S3-S4)Pd/(S1-S2)-\\ &(S2-S3+S4)Pc/(S1-S2)+\\ &(F1-F3)/(S1-S2) \end{aligned} \quad (12)$$

When the equation (12) is compared with the aforementioned equations (3) and (6) of the prior art and the first embodiment, it can be seen that the item—(S3–S4)/(S1–S2) determines an inclination of the lines with respect to the relationship between Pd and Ps in the cartesian coordinates of (Pd, Ps), and that (S3–S4)/(S1–S2) of the equation (12) can always be smaller than S3/(S1–S2) of the equations (3) and (6).

Therefore, the capacity control valve 30B of the second embodiment can carry out the same operation as the capacity control valve 30A of the first embodiment. Further, since the communication passageways 33b can be shorter than the communication passageways 33a of the first embodiment, the manufacture of the capacity control valve 30B can be easier than the valve 30A from the construction viewpoint.

Figure 7:
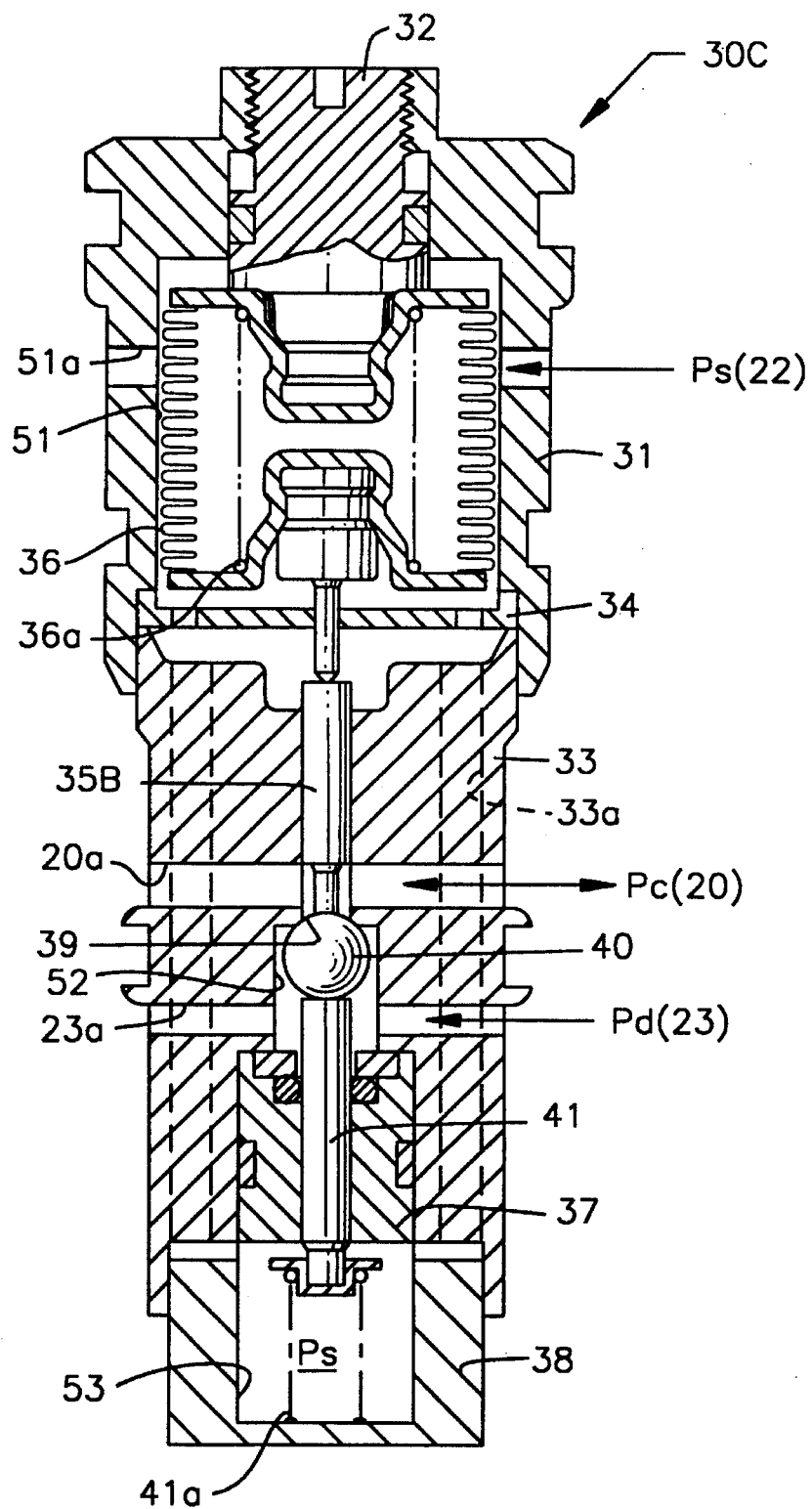
FIG. 7 is a cross-sectional view of a capacity control valve, incorporated in a variable capacity refrigerant compressor, according to a third embodiment of the present invention.
Figure 8A:
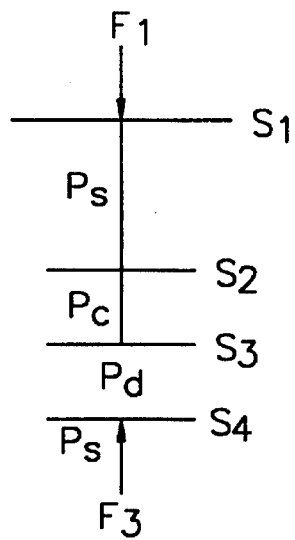
FIG. 8A is a schematic view of the control valve of FIG. 7, illustrating a state thereof in which a refrigerant discharge pressure of the compressor is increased beyond a predetermined pressure level.
Figure 8B:
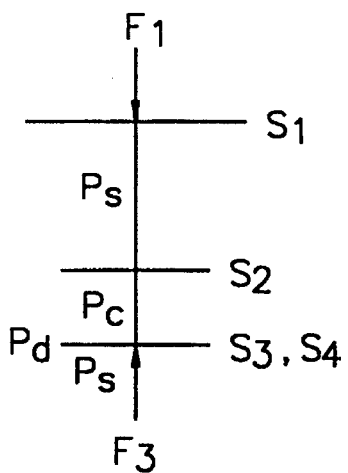
FIG. 8B is a view similar to FIG. 8A, illustrating a different state in which the refrigerant discharge pressure of the compressor is reduced below the predetermined pressure level.

FIGS. 7, 8A, and 8B illustrate a third embodiment of the present invention.

A capacity control valve 30C of the third embodiment is different from that of the first embodiment in that a rod 35b of the valve 30C moved by the bellows 36 has the same cross-sectional area S2 as the area S3 of the valve seat 39 as shown in FIGS. 8A and 8B. Further, the cross-sectional area S3 of the valve seat 39 is also the same as that S4 of the pressure responsive rod 41. Namely, in the capacity control valve 30C, the condition S2=S3=S4 is preliminarily established. The remaining construction of the valve 30C is similar to that of the capacity control valve 30A of the first embodiment, and therefore, the same reference numerals are used to designate the same elements and parts.

With the capacity control valve 30C of the third embodiment, the operation thereof is the same as that of the valve 30A of the first embodiment when the discharge pressure Pd of the refrigerant gas is beyond a predetermined pressure level Pd0.

As shown in FIG. 8A, a force F1 expanding the bellows 36 can be obtained from the aforementioned equation (4) of the first embodiment by setting S2 Pc=S3 Pc, and S2 Ps=S3 Ps. Namely, the force F1 can be defined as the equation (13) as set forth below.

$$F1=(S1-S3)Ps+S3\ Pd \tag{13}$$

When the equation (13) is compared with the aforementioned equations (2) and (5) of the prior art and the first, embodiment, it can be seen that, in the equation (13) as the item "Pc–Ps", i.e., a differential of the crank chamber pressure Pc and the suction pressure Ps is not included, and does not have any influence on determination of the force F1.

On the other hand, when the discharge pressure Pd of the refrigerant gas is below a predetermined pressure level Pd0 so that the pressure responsive rod 41 is urged upward by the biasing spring force of the compression spring 41a, the pressure responsive rod 41 is engaged with the ball valve 40.

At this stage, it should be understood that according to the comparison of the capacity control valve 30C with the valve 30A of the first embodiment, the equation of the force F1 is obtained by setting S2 Pc=S3 Pc, and S2 Ps=S4 Ps in the equation (7) of the first embodiment. Further, in the equation (7) a force S3 Pd which is a force acting on the ball valve 40 due to the discharge pressure Pd is considered to be equal to a force S4 Pd acting on the pressure responsive rod 41 due to the discharge pressure Pd (S3 Pd=S4 Pd).

Thus, from the schematic illustration of FIG. 8B, it is understood that the force F1 of the capacity control valve 30C can be defined as the equation (8) as set forth below.

$$F1=S1\ Ps+F3 \tag{14}$$

When the equation (14) is compared with the equation (8) of the first embodiment, it is understood that in the valve 30C, the force F1 is not influenced by the crank chamber pressure Pc. Accordingly, the opening areas of the gas-supply passageways 23, 23a, 20a, and 20 are determined without being affected by the discharge pressure Pd and the crank chamber pressure Pc, and an appropriate opening areas of the gas-supply passageways can be determined irrespective of the pressure levels of the discharge pressure Pd and the crank chamber pressure Pc.

Therefore, according to the third embodiment, the determination of the opening areas of the gas-supply passageways 23a, 23, 20a and 20 can be made easy, compared with the first embodiment. Nevertheless, the operation of both capacity control valves 30A and 30C is substantially the same.

Although the first through third embodiments of the present invention do not employ a valve construction in which a spring for urging the ball valve 40 upward by a biasing force F2 is arranged in the valve mechanism, a modification may be made by employing such biasing spring constantly urging the ball valve 40 toward the valve seat 39 so as to further stabilize the operation of the capacity control valve of the present invention. Then, the equations similar to the equations (1) through (3) of the prior art valve of FIG. 9 can be obtained by taking into account the force F2 of the biasing spring. The operation and the advantageous effect of such modified capacity control valve can be the same as those of the capacity control valves 30A through 30C according to the first through third embodiments.

Further, the capacity control valve according to the present invention may be incorporated in many variable capacity refrigerant compressors different from the illustrated variable capacity wobble type compressor if the compressors are provided with a suction chamber, a discharge chamber, and a crank chamber, respectively.

It should be understood that the bellows used as a suction pressure responsive element of the illustrated capacity control valves 30A through 30C may be replaced with a different pressure responsive element such as a diaphragm.

It should be further understood that the O-ring used for sealing the pressure responsive rod 41 in the inserter element 37 may be omitted as required.

From the foregoing description, it will be understood that the variable capacity refrigerant compressor provided with the capacity control valve according to the present invention is able to constantly exhibit a satisfactory refrigerating performance irrespective of a change in the environmental temperature from a high to a low temperature and vice versa. Therefore, when the compressor is accommodated in a climate control system of an automobile provided with an air-switching unit such as a damper unit capable of switching between a recirculating system and a fresh air system, and when the fresh air is introduced into the automobile cabin through the climate control system during, for example, the winter season, the air can be dehumidified by the refrigerating circuit of the climate control system before being heated. Thus, the automobile's windows are not fogged.

It should be understood that many modifications and variations will occur to a person skilled in the art without departing from the scope of the invention as claimed in the accompanying claims.

We claim:

1. A capacity control valve for adjustably changing the capacity of a variable capacity refrigerant compressor comprising a suction chamber for a refrigerant gas before compression, a discharge chamber for the refrigerant gas after compression and a crank chamber capable of communicating with the suction and discharge chambers, said capacity control valve being incorporated in said variable capacity refrigerant compressor, comprising: a suction pressure responsive means arranged for exhibiting a first forward movement and a second reverse movement in response to a change in suction pressure of the refrigerant gas, a valve means arranged for controlling opening and closing of a gas-supply passageway means extending between said discharge chamber and said crank chamber of the variable capacity refrigerant compressor, said valve means reducing an opening area of said gas supply passageway means according to the first forward movement of said suction pressure responsive means when the suction pressure of the refrigerant gas is above a predetermined suction pressure level, and increasing the opening area of said gas-supply passageway means according to the second reverse movement of said suction pressure responsive means when the suction pressure of the refrigerant gas is below the predetermined suction pressure level so as to control the pressure level prevailing in said crank chamber of said compressor to thereby adjustably change the compressor capacity and a discharge pressure responsive means arranged to exhibit forward and backward movements in response to changes in discharge pressure of the refrigerant gas, said discharge pressure responsive means being operatively coupled with said valve means in such a manner that said valve means reduces the opening area of said gas-supply passageway means in response to one of said forward and backward movements of said discharge pressure responsive means only when the discharge pressure of the refrigerant gas is below a predetermined discharge pressure.

2. A capacity control valve for adjustably changing the capacity of a variable capacity refrigerant compressor, according to claim 1, wherein said discharge pressure responsive means and said valve means are arranged in such a manner that said valve means and said discharge pressure responsive means are subjected to an equal force due to the discharge pressure when said discharge pressure of the refrigerant gas is below said predetermined discharge pressure.

3. A capacity control valve for adjustably changing the capacity of a variable capacity refrigerant compressor, according to claim 1, wherein said valve means comprises a body means for defining therein a pressure chamber in said gas-supply passageway means and to be constantly in communication with said discharge chamber of said compressor and, a valve seat formed in said body means in registration with said pressure chamber, a ball means received in said pressure chamber movable toward and away from said valve seat to thereby open and close said gas-supply passageway means.

4. A capacity control valve for adjustably changing the capacity of a variable capacity refrigerant compressor, according to claim 3, wherein said ball means is continuously coupled with said suction pressure responsive means via a movable rod member.

5. A capacity control valve for adjustably changing the capacity of a variable capacity refrigerant compressor, according to claim 3, wherein said discharge pressure responsive means comprises:

a slidable rod member having a first end thereof arranged for engagement with and disengagement from said ball means and arranged so as to be exposed to said pressure chamber to be thereby constantly subjected to the discharge pressure of the refrigerant gas, and a second end thereof apart from said first end and exposed to a different pressure chamber for said suction pressure; and a biasing means arranged with said second end for continuously urging said slidable rod member toward said ball means of said valve means against said discharge pressure of the refrigerant gas.

6. A capacity control valve for changing the capacity of a variable capacity refrigerant compressor according to claim 3, wherein said discharge pressure responsive means comprises:

a slidable rod member having a first end thereof for engagement with and disengagement from said ball means and arranged to be exposed to the pressure in said pressure chamber to thereby be continuously subjected to the discharge pressure of the refrigerant gas, and a second end apart from said first end and arranged in a different pressure chamber for exposure to pressure in said crank chamber; and a biasing means engaged with said second end for constantly urging said slidable rod member toward said ball means of said valve means against said discharge pressure of the refrigerant gas.

* * * * *